United States Patent [19]

Butler

[11] Patent Number: 5,043,040

[45] Date of Patent: Aug. 27, 1991

[54] SLITTING OF PLASTIC FILM

[75] Inventor: Michael D. Butler, North Andover, Mass.

[73] Assignee: Borden, Inc., Columbus, Ohio

[21] Appl. No.: 400,388

[22] Filed: Aug. 30, 1989

[51] Int. Cl.$^5$ .............................................. B29C 47/06
[52] U.S. Cl. .......................... 156/244.11; 156/244.18; 156/244.19; 428/347; 428/349; 428/910
[58] Field of Search ...................... 156/244.11, 244.18, 156/244.19; 428/347, 349, 910

[56] References Cited

U.S. PATENT DOCUMENTS

| | | | |
|---|---|---|---|
| 3,980,611 | 9/1976 | Anderson et al. | 428/220 |
| 4,101,050 | 7/1978 | Buckler et al. | 428/158 |
| 4,147,291 | 4/1979 | Alcao et al. | 428/218 |
| 4,595,625 | 6/1986 | Crass et al. | 428/331 |
| 4,659,612 | 4/1987 | Balloni et al. | 428/349 |
| 4,666,772 | 5/1987 | Schinkle et al. | 428/330 |
| 4,764,425 | 8/1988 | Balloni et al. | 428/349 |
| 4,911,976 | 3/1990 | Park et al. | 428/216 |

*Primary Examiner*—Caleb Weston
*Attorney, Agent, or Firm*—Dennis H. Rainear; Kenneth P. Van Wyck

[57] ABSTRACT

The invention relates to a process for improving the slittability and subsequent wind-up of a roll of clear plastic multilayer coextrusion film by the addition to the skin layer of a slitting aid. The slitting aid is an inorganic filler material the presence of which in the skin layer reduces or eliminates telescoping of the rolled coextruded film, facilitates faster line speed, and allows the reduction of taper tension as the wind-up process progresses.

11 Claims, No Drawings

SLITTING OF PLASTIC FILM

BACKGROUND OF THE INVENTION

In the production of plastic films for use in, for example, food wrap applications, it is known to coextrude two or more polymeric materials to produce a clear coextrusion multilayer film or extrusion coated film. The selection of the particular polymeric materials for coextrusion is dictated by the desired properties of the coextruded multilayer film or extruded coated film. Thus, it is known, for example, to coextrude multilayer films comprising layers of polystyrene and one or more layers of a natural rubber, styrene-butadiene copolymer, polybutadiene, poly-isoprene, vinyl polymers, conjugated diolefin polymers, and others.

It is also known to put various additives and/or agents into one or more of the layers in coextruded films to achieve certain properties. For example, it is known to add fillers, such as calcium carbonate, magnesium carbonate, calcium sulphate, aluminum oxide and hydrates thereof, clay, aluminum sulphate, silica, talc, mica, wollastonite, vermiculite, asbestos fibers, and glass fibers, to a layer of styrene polymer composition in a thermoplastic polymeric laminate. U.S. Pat. No. 4,101,050, issued July 18, 1978 to Buckler, et al., teaches such addition of fillers to produce laminates which can be formed and molded into plastic products such as containers having desirable combination of properties.

It is also known to add $SiO_2$ in a monolayer film rather than in a multilayer coextruded film. However, the addition of $SiO_2$ in monolayer films has been in methods which disperse the $SiO_2$ throughout the full thickness of the product film. Furthermore, the inventors believe that such addition of $SiO_2$ has been for use as a slip additive to increase slipperiness of the film or for achieving anti-blocking properties.

U.S. Pat. No. 4,595,625, issued June 17, 1986 to Crass et al., teaches a sealable transparent multilayer film comprising a base layer and at least one sealable layer. The sealable layer comprises from about 0.1 to 1.0% by weight of a silicate, such as aluminum silicate, having the shape of platelets. The sealable layer also, however, is required to contain several other materials, including an olefin resin composition, a low molecular weight resin which is compatible with the olefin resin composition, a propylene homopolymer, and a polydiorganosiloxane. These added materials tend to increase the cost and complexity of the film.

U.S. Pat. No. 4,147,291, issued Apr. 3, 1979 to Akao, et al., teaches the use of inorganic fillers, including clay, as a light-intercepting agent or as a pigment in a low density polyethylene film used as part of a multilayer construction useful as a packing bag.

U.S. Pat. No. 4,132,700, issued Jan. 2, 1979 to Stephens, deceased, et al., teaches a process for preparing polyvinyl chloride compositions containing acid-treated talc particles or kaolinite particles. The acid treatment is required for achieving the desired increased tensile strength but results in some discoloration of the plastic film produced. Ammonia or amine treatment of kaolinite particles is taught in Stephens, et al., for increasing tensile strength without discoloration of polyvinyl chloride compositions.

U.S. Pat. No. 4,666,772, issued May 19, 1987 to Schinkel, et al., is related to an opaque heat-sealable multilayer film consisting of a biaxially oriented base layer of polypropylene polymers (BOPP) containing 3 to 15% by weight of additives, such as calcium carbonate, silica, Na-Al silicate and/or titanium dioxide. The additive in Schinkel, et al., must be incompatible with the propylene polymer of the BOPP base layer of the film so as to produce the desired opaque product. Schinkel, et al., does not teach the use of kaolin clay in clear films or the advantage of improved slittability resulting therefrom, but rather is directed toward producing heat-sealable opaque films, containing at least one monoaxially-oriented layer.

U.S. Pat. No. 3,221,226, issued Nov. 30, 1965 to Kennedy, et al., teaches the production of an electrical capacitor comprising a smooth roll of polyester film containing a finely divided, dispersed inorganic pigment. The pigment of Kennedy, et al., can include kaolin (china clay). However, the purpose of the addition of pigment to the polyester film of Kennedy, et al., is to produce desirable slipperiness therein, allowing single sheets of film to be fed into packaging equipment without wrinkling.

U.S. Pat. No. 2,527,329, issued Oct. 24, 1950 to Powers, et al., teaches the topical treatment of the outer surfaces of textile fabrics with an aqueous colloidal solution of silica. The silica solution of Powers, et al., is a silica sol applied to fibers to form a film of silica on the surface of the fibers, whereby certain physical properties of the fibers are improved.

One disadvantage of many of the films described in the above references is the high tendency of the rolled films to telescope during handling, on the slitter, or when the film roll is inserted into a packaging machine. By "telescoping" herein is meant a lateral displacement of the film on the roll, in which the surfaces of adjacent layers all slide to one side or the other in an uncontrolled or undesired manner or extent, as a result of which the edges of the film are no longer positioned exactly above one another. Instead, each layer is displaced in one direction or the other by a small amount, and therefore the whole roll protrudes from one side of the mandrel. Telescoping can result when rolls are bumped against something or when they are held in a slightly inclined position. Thus a need exists for a process for improving the slittability and subsequent wind up into a roll of clear plastic film.

It is therefore an object of the present invention to produce a multilayer clear BOPP coextruded film which can be readily slit and subsequently wound onto a roll with little or no telescoping. It is also an object of this invention to provide a process for improving the slittability and subsequent winding into a roll of plastic multilayer coextrusion film.

SUMMARY OF THE INVENTION

The invention relates to a process for improving the slitting or slicing and subsequent wind-up of plastic films. The invention further relates to a plastic film formulation which produces a film capable of being slit and subsequently wound, while experiencing less lateral slip, reduced telescoping, improved lay-flat property, improved side-to-side uniformity, reduced distortion, and increased slitter speed.

An object of the present invention is to reduce the cost of the film-roughening process. It is a further object of the present invention to reduce hazing and other optical defects of clear heat-sealable and slip films without producing telescoping of the rolled films.

DETAILED DESCRIPTION OF THE INVENTION

We have surprisingly found that the incorporation of specific amounts of finely divided inorganic fillers, such as for example, kaolin clay, in the skin layer only of a coextruded plastic film achieves the above objects. The present invention limits the addition of the filler or slitting aid to the skin layer of a preferrably clear, coextruded BOPP film, which facilitates a significant cost reduction relative to the incorporation of an additive to the full thickness of a coextruded film as shown in the prior art. By the process of the present invention, the amount of haze in the film is lessened, desired optical properties can be achieved, and telescoping is reduced or essentially eliminated.

It is surprising that the incorporation of the slitting aid in the present invention reduces the slipping or telescoping of the rolled-up film after slitting because the incorporation of the slitting aid actually reduces rather than increases the coefficient of friction of the coextruded film as measured by a standard COF test (ASTM No. D1894). It might therefore be expected that the rolled film would exhibit increased telescoping, but the surprising result is the opposite.

It should be noted that the present invention does not require all the additives, polymers or copolymers utilized heretofore, such as in for Example U.S. Pat. No. 4,595,625 issued to Crass et al. Thus in the present invention the skin layer is simple and less expensive than those taught by Crass et al.

By "skin layer" herein is meant the surface layer, heat sealable layer or outermost layer of a coextruded film. In the present invention, the skin layer can constitute any desirable percentage of the total film structure, however, the skin layer will commonly represent up to, for example, 50% of the total film thickness. More preferably, the skin layer, according to the present invention, is a minor percentage of the total film structure and represents 1%-25% of the total thickness. The most preferred embodiment has a skin layer equal to about 5%-10% of the total film structure.

The skin layer can be one of two layers in a coextruded film wherein the second layer is a polymeric base layer. A skin layer can also be placed on each side of a base layer to form a three layer coextruded film. In such a three ply coextruded film, the skin layers need not be identical in chemical composition, or in thickness, or in the slitting aid used, or in the level of slitting aid used.

By "slitting" herein is meant the cutting, slicing, puncturing, tearing, ripping or otherwise rendering of an extruded or coextruded film into two or more pieces or strips. The slitting of the coextruded film can be performed by any conventional technique or process known to those skilled in the art, including but not limited to, metal knives, air knives, wires, lasers, water jets, heat, and combinations thereof.

Slittability herein is measured by the tendency of the coextruded film upon slitting to cleanly separate into two or more pieces or strips with minimal resistance and to subsequently be rolled up with minimal telescoping, i.e. slipping between revolutions in a roll. By the process of the present invention, slittability and roll-up of the coextruded film is improved relative to the slittability and roll-up of a coextruded film in which the slitting aid is not present in the polymeric skin layer of the coextruded film.

The inventors believe, but do not wish to be limited to the theory, that the incorporation of specific amounts of kaolin clay as a slitting aid in the skin layer of a coextruded plastic film results in the roughening of the skin surface of the film sufficient to allow a minute air cushion to enter between adjacent film revolutions on a wind-up roll. The air cushion produced, however, by the roughening of the skin layer according to the present invention is not so great or extensive as to limit all film-to-film contact on a roll. In fact, by the present invention the slitting aid in the skin layer protrudes sufficiently to pierce the air cushion and contact the adjacent revolution in a roll. Thus, the extent of film-to-film contact and therefore minimizing the extent of slippage in a roll, can be adjusted according to the present invention to thereby improve control of the winding of the slit film onto a roll and the lay-flat property of the film. This reduces the adverse effects of residual shrinkage and gauge bands and improves side-to-side uniformity.

In addition to minimizing telescoping of rolled coextruded film and improving the lay-flat property of the film, the present invention also allows for utilization of slitter/wind-up conditions which would otherwise increase telescoping. Such slitter/wind-up conditions include the reduction of tension taper, which, as discussed in Example 1, can surprisingly be incorporated without adverse effect. Tension taper is the change in tension applied to the film roll as it is progressively rolled. Generally, the tension is intentionally reduced as the rolling process progresses, which thereby reduces the likelihood of telescoping of the rolled film.

As shown in Example 2, a further advantage of the process of the present invention is the ability to run the slitter/wind-up operation at a faster rate than is possible in the absence of the slitting aid in the skin layer. It is believed that this increased production speed is possible due to the creation of contact points which pierce the air caught between layers and interlock the layers of each revolution of the roll during and after slitting. The higher speeds facilitated by the present invention would normally be expected to produce excessive telescoping of the wound roll.

In the present invention, by "slitting aid" herein is meant an inorganic additive or agent incorporated into the polymeric composition of the skin layer of a coextruded film, whereby the slitting and wind-up of the roll is improved. Slitting aid additives include among others silicon dioxide, mica, potassium aluminum silicate, titanium dioxide, talc and calcium carbonate. A more preferred slitting aid is kaolin clay. The silicon dioxide and titanium dioxide are operative, but less preferred because they are less easily dispersed in films such as polypropylene, and thus tend to produce a haze or cloudiness. Other inorganic fillers known to those skilled in the art are also operative herein.

The amount of slitting aid utilized in the present invention can vary depending on the degree of roughening of the skin layer which is desired. No limitation is known as to the maximum amount of slitting aid; however, excessive amounts eventually will lead to poor optical properties of the coextruded film. The minimum amount of slitting aid operative herein is an amount sufficient to improve the slittability and wind-up relative to that for a film without the slitting aid. Thus a preferred range of amounts of slitting aid incorporated into the skin layer are from about 500 ppm to about 5000 ppm. A more preferred embodiment utilizes approximately 3,000 parts per million of kaolin clay evenly dispersed in only the skin layer of a clear coextruded film.

The particle size of the slitting aid utilized can also vary depending on the thickness of the coextruded film but a preferred size is less than about 100 microns. A more preferred particle size is from about 0.5 microns to about 10 microns.

Thus, an object of the present invention is achieved by providing a process for improving the slitting, and subsequent winding into a roll, of plastic multilayer coextrusion film, which film comprises at least one polymeric skin layer and at least one polymeric base layer, said process comprising the steps:

(a) adding to at least one polymeric skin layer, or its precursor composition, an inorganic slitting aid, wherein the slitting aid is present in the skin layer at a level equal to or greater than 500 parts per million on a weight basis; and (b) coextruding the polymeric skin layer of step (a) and a polymeric base layer which does not contain a slitting aid to produce a multilayer, plastic coextrusion film whereby the slittability of the plastic coextrusion film of step (b) is improved relative to the slittability of the coextruded film produced in the absence of the slitting aid.

In a preferred embodiment of the process, both the polymeric skin layer or layers and the polymeric base layer are clear.

By "coextruding" herein is meant both the simultaneous and sequential extrusion of the polymeric skin layer and the polymeric base layer. "Coextruding" herein shall also mean the extrusion coating of one layer onto the other or the laminating of two or more layers.

The polymeric composition which forms the skin layer of the clear plastic coextruded film according to the present invention may be selected from the group of clear polymeric materials consisting of polypropylene, propylene-ethylene copolymers, propylene-ethylene-butene terpolymers, propylene-butylene copolymers, ethylene-butylene copolymers, ethylene vinyl acetate, ethylene methacrylate, ionomers (such as, for example Surlyn ®), ethylene methyl methacrylate, and mixtures thereof. The polymeric composition of the skin layer can be a mixture of two or more of these polymeric materials, and/or may further comprise up to approximately 60% by weight of another alpha-olefin containing at most 8 carbon atoms, preferably ethylene. Additional polymers or copolymers of various organic materials may also be incorporated into the composition which forms the skin layer.

The second or polymeric base layer of the clear plastic coextruded film according to the present invention is a polymeric composition preferably comprising polypropylene. Additional additives, polymers, copolymers, resins and/or oils may be incorporated into the base layer to achieve specific desired properties, by processes known to those skilled in the art. According to the present invention, it is not desirable to add kaolin clay or other slitting aids to the base layer since such addition would increase the cost without providing improved slitting and wind-up capabilities beyond those achieved by the incorporation of the slitting aid into the polymeric skin layer of the coextruded film. Futhermore, the addition of kaolin clay or other slitting aids to the base layer would result in poorer optical properties.

In a preferred embodiment of the present invention, at least one layer of the multilayer, clear coextruded film is a heat-sealable layer.

In another preferred embodiment the polymeric skin layer or the polymeric base layer is, or both are, biaxially oriented polypropylene (BOPP). The polymeric skin layer can also be coextruded or extrusion coated as a monoaxially oriented skin layer.

In a more preferred embodiment, the skin layer or layers and the polymeric base layer are made of the same material, preferably propylene homopolymer and differ only in the kaolin clay added to the skin layer or layers.

The layers of the coextruded film can be prepared by any suitable method for insuring a substantially uniform mixture of the continuous polymeric composition of the skin layer and the discontinuous slitting aid in the skin layer of the final coextruded film. The slitting aid may be conveniently incorporated in the polymeric composition of the skin layer by conventional techniques known to the skilled artisan, including but not limited to, blending the ingredients in an apparatus such as a Wellex mixer, heater rolls, two roll mill, three roll mill, reactor vessel, compounding extruder, or in combinations thereof.

To further illustrate the invention, and not to be deemed in any way to limit the invention, the following examples are provided.

EXAMPLE

Taper Tension Reduction

Kaolin clay was dispersed in polypropylene at 3000 ppm using a compounding extruder and then mechanically mixed. This mixture was coextruded as a 5 gauge skin layer with a 75 gauge polypropylene base layer.

The coextruded film produced permitted reduction of the taper tension settings on the slitter machine from 80% to 65% relative to a coextruded film without the kaolin clay. Initial tension settings on the slitter machine were also reduced from 6.5 to 5.0. These changes resulted in the production of slit rolls of film having a more uniform wind and which were less prone to telescoping either during slitting or during subsequent handling. In addition, the coextruded film of the invention exhibited less visual distortion, particularly near the core, than did coextruded film without the slitting aid.

EXAMPLE 2

Slitting Speeds

In a 70 gauge, one side heat sealable, multilayer coextruded film, 3000 ppm of kaolin clay was incorporated into the 5 gauge polypropylene skin layer as described in exampe one. The improved slitting characteristics with clay permitted raising the slitting speeds from 250 meters/minute to 450 meters per minute without any telescoping. Speed had previously been limited to 250 meters/minutes because of severe telescoping tendencies.

EXAMPLE 3

Coefficient of Friction (COF) Testing

Two samples of one side heat sealable multilayer films were prepared wherein the skin layer was composed of a copolymer of polypropylene and polyethylene (94 propylene: 6 ethylene) and slip additive. One of the samples also contained in the skin layer 1500 pp of kaolin clay slitting aid while the other sample had no slitting aid. The films were measured for COF according to ASTM D1894 after the samples underwent a 4 hour aging at 40° Centigrade. The amples were tested for core layer-on-core layer (C/C) friction and skin layer-on-skin layer (S/S) for both static and dynamic values. The results, shown below, indicate a significant drop in the COF value of the skin layer with kaolin clay slitting aid added for both static and dynamic measurements.

|     | Control film (no clay) | | Experimental film (1500 ppm clay) | |
| --- | --- | --- | --- | --- |
|     | Static | Dynamic | Static | Dynamic |
| C/C | 0.23 | 0.18 | 0.19 | 0.17 |
| S/S | 0.26 | 0.22 | 0.16 | 0.15 |

These results indicate a surprising reduction in COF upon the addition of the slitting aid, yet telescoping of the rolled film is not increased.

That which is claimed is:

1. A process for increasing the slitting speed, and subsequent winding speed into a roll, of plastic multilayer coextrusion film, which film comprises at least one polymeric skin layer and at least one polymeric base layer, said method comprising the steps:
    (a) adding to at least one polymeric skin layer, or its precursor composition, an inorganic slitting aid, wherein the slitting aid is present in the skin layer at a level equal to or greater than 500 parts per million on a weight basis and wherein the slitting aid has a particle size of 0.5 to 10 microns; and
    (b) coextruding the polymeric skin layer of step (a) and a polymeric base layer which does not contain a slitting aid to produce a multilayer, plastic coextrusion film whereby the slitting speed and subsequent winding speed onto a roll of the plastic coextrusion film of step (b) are increased relative to the slitting and winding of the coextruded film produced in the absence of the slitting aid in the skin layer.

2. The process of claim 1 wherein at least one of the layers of the plastic coextrusion film is biaxially oriented polypropylene film.

3. The process of claim 2 wherein the slitting aid is present in the skin layer at 1,500 to 3,000 parts per million by weight.

4. The process of claim 1 wherein at least one layer of the multilayer, plastic coextrusion film is a heat-sealable film.

5. The process of claim 1 further comprising the step (c) slitting and winding onto a roll the multiplayer, coextrusion film of step (b), whereby telescoping of the rolled film is essentially eliminated.

6. The process of claim 1 wherein the slitting aid is selected from the group consisting of kaolin clay, mica, silicon dioxide, potassium aluminum silicate, talc and calcium carbonate.

7. The process of claim 1 wherein at least one of the layers of multilayer, plastic coextrusion film is biaxially oriented polypropylene, and wherein the slitting aid added to the skin layer is kaolin clay, present in the skin layer at a level equal to about 3,000 parts per million.

8. The process of claim 1 wherein the polymeric skin layer and the polymeric base layer are propylene homopolymer.

9. The process of claim 8 wherein the coextruded, plastic multilayer film contains a slitting aid selected from the group consisting of kaolin clay, mica, potassium aluminum silicate, silicon dioxide, talc and calcium carbonate.

10. The process of claim 8 wherein at least one layer of the coextruded, plastic multilayer film is biaxially oriented polypropylene.

11. A method of using a slitting aid for improving the slittability, and subsequent winding into a roll, of plastic multilayer coextrusion film, which film comprises at least one polymeric skin layer and at least one polymeric base layer, said method comprising the steps:
    (a) adding to at least one polymeric skin layer, or its precursor composition, an inorganic slitting aid, wherein the slitting aid is present in the skin layer at a level equal to or greater than 500 parts per million on a weight basis; and
    (b) coextruding the polymeric skin layer of step (a) and a polymeric base layer which does not contain a slitting aid to produce a multilayer, plastic coextrusion film whereby the slittability and subsequent winding onto a roll of the plastic coextrusion film of step (b) is improved relative to the slittabilty and winding of the coextruded film produce din the absence of the slitting aid in the skin layer.

* * * * *